United States Patent
Kleinbach et al.

(10) Patent No.: US 12,557,048 B2
(45) Date of Patent: Feb. 17, 2026

(54) METHOD FOR WIRELESS TIME SYNCHRONIZATION OF A FIRST ELECTRICAL UNIT WITH A SECOND ELECTRICAL UNIT

(71) Applicant: Robert Bosch GmbH, Stuttgart (DE)

(72) Inventors: Jakob Kleinbach, Balingen (DE); Juergen Stegmaier, Wannweil (DE); Marcus Boege, Dusslingen (DE); Marius Hagmayer, Waeschenbeuren (DE); Thomas Mattes, Eningen Unter Achalm (DE)

(73) Assignee: Robert Bosch GmbH, Stuttgart (DE)

( * ) Notice: Subject to any disclaimer, the term of this patent is extended or adjusted under 35 U.S.C. 154(b) by 328 days.

(21) Appl. No.: 18/482,349

(22) Filed: Oct. 6, 2023

(65) Prior Publication Data
US 2024/0129871 A1  Apr. 18, 2024

(30) Foreign Application Priority Data
Oct. 13, 2022 (DE) .................... 10 2022 210 800.0

(51) Int. Cl.
*H04W 56/00* (2009.01)
(52) U.S. Cl.
CPC ............... *H04W 56/0015* (2013.01)
(58) Field of Classification Search
CPC . H04W 56/0015; H04W 56/001; H04W 4/40; H04J 3/0661
See application file for complete search history.

(56) References Cited

U.S. PATENT DOCUMENTS

| 2006/0085163 A1* | 4/2006 | Nader | H04W 36/324 |
| | | | 702/187 |
| 2011/0249688 A1* | 10/2011 | Liu | H04W 56/002 |
| | | | 370/503 |

(Continued)

FOREIGN PATENT DOCUMENTS

| DE | 10 2013 017 280 A1 | 4/2015 |
| DE | 10 2018 207 684 A1 | 11/2019 |

(Continued)

*Primary Examiner* — Benjamin H Elliott, IV
(74) *Attorney, Agent, or Firm* — Maginot, Moore & Beck LLP

(57) ABSTRACT

A method for wireless time synchronization of a first electrical unit with a second electrical unit is disclosed, which can in particular be intermittently wirelessly connected to each other, in particular via a low-energy connection, wherein the first electrical unit includes a first time counter and the second electrical unit comprises a second time counter, and wherein a connection event occurs repeatedly at predetermined connection time intervals. The method includes (a) transmitting a first data packet, by the first electrical unit, to the second electrical unit upon a first connection event, (b) receiving the first data packet and creating a second timestamp based on the second time counter, by the second electrical unit, (c) transmitting a second data packet with the created second timestamp, by the second electrical unit, to the first electrical unit upon a next connection event, (d) receiving the second data packet by the first electrical unit, (e) determining a current time, by the first electrical unit, based on one or more time periods of the predetermined connection time interval and the second timestamp, and (f) setting the first time counter to the current time determined.

20 Claims, 3 Drawing Sheets

(56) References Cited

U.S. PATENT DOCUMENTS

| | | | | |
|---|---|---|---|---|
| 2016/0234796 | A1* | 8/2016 | Brecht | G05D 1/0022 |
| 2017/0195109 | A1* | 7/2017 | Perez-Cruz | G01S 5/0081 |
| 2017/0357556 | A1* | 12/2017 | Bisig | G06F 1/08 |
| 2021/0218656 | A1* | 7/2021 | Meier | H04J 3/14 |
| 2022/0150305 | A1* | 5/2022 | Weber | H04J 3/0673 |
| 2024/0129871 | A1* | 4/2024 | Kleinbach | H04W 56/0015 |
| 2024/0137246 | A1* | 4/2024 | Zinner | H04L 43/0852 |
| 2024/0236892 | A1* | 7/2024 | Guignard | H04W 56/0045 |

FOREIGN PATENT DOCUMENTS

| | | |
|---|---|---|
| DE | 10 2019 206 137 A1 | 10/2020 |
| DE | 10 2021 201 663 A1 | 8/2022 |

* cited by examiner

METHOD FOR WIRELESS TIME SYNCHRONIZATION OF A FIRST ELECTRICAL UNIT WITH A SECOND ELECTRICAL UNIT

This application claims priority under 35 U.S.C. § 119 to patent application no. DE 10 2022 210 800.0, filed on Oct. 13, 2022 in Germany, the disclosure of which is incorporated herein by reference in its entirety.

The disclosure relates to a method for wireless time synchronization of a first electrical unit with a second electrical unit, which are intermittently wirelessly connected to each other, in particular via a low-energy connection, wherein the first electrical unit comprises a first time counter and the second electrical unit comprises a second time counter, and wherein a connection event occurs repeatedly at predetermined connection time intervals.

The disclosure further relates to a system for wireless time synchronization, comprising a first electrical unit and a second electrical unit, which are intermittently wirelessly connected to each other, in particular via a low-energy connection, wherein the first electrical unit comprises a first time counter and the second electrical unit comprises a second time counter, and wherein a connection event occurs repeatedly at predetermined connection time intervals.

Furthermore, the disclosure relates to a vehicle, in particular a single-lane vehicle with driving assistance drive, such as an e-bike or the like, having a central communication interface, gear mechatronics, and/or a drive unit, wherein, as electrical units, the central communication interface, the gear mechatronics, or the drive unit is configured as one of the two electrical units.

BACKGROUND

Methods for highly accurate time synchronization are common in the film and video industry, for example. In the process, wirelessly connected devices which are within a radius of about 10 m are synchronized. For example, devices to be synchronized include external microphones and cameras to synchronize sound and image. Elaborate subsequent synchronization is thus avoided.

With the development of recent years in the field of e-bikes, the requirements for wireless communication between different electrical units, such as cell phone, communication interface, gear mechatronics, or drive unit, have also increased.

For example, during gear changes, the communication interface, drive unit, and gear mechatronics may wirelessly communicate with each other via low-energy connections, such as Bluetooth connections. In so doing, the drive unit may pre-calculate a suitable window of time in the range of a load minimum, generally lower or upper crank dead center, in which the gear change is to occur. By simultaneously reducing drive torque and shifting the gear ratio by means of a front derailleur, rear derailleur, CVT, planetary gear, or the like, the load and wear on the shifting and drive components during the gear change can be significantly reduced. To this end, a sufficiently accurate time synchronization between the gear mechatronics, communication interface, and drive unit is required.

SUMMARY

In one embodiment, the present disclosure provides a method for wireless time synchronization of a first electrical unit with a second electrical unit, which can in particular be intermittently wirelessly connected to each other, in particular via a low-energy connection, wherein the first electrical unit comprises a first time counter and the second electrical unit comprises a second time counter, and wherein a connection event occurs repeatedly at predetermined connection time intervals, comprising:
 a) transmitting a first data packet, by the first electrical unit, to the second electrical unit upon a first connection event,
 b) receiving the first data packet and creating a second timestamp based on the second time counter, by the second electrical unit,
 c) transmitting a second data packet with the created second timestamp, by the second electrical unit, to the first electrical unit upon a next connection event,
 d) receiving the second data packet by the first electrical unit,
 e) determining a current time, by the first electrical unit, based on one or more time periods of the predetermined connection time interval and the second timestamp,
 f) setting the first time counter to the current time determined.

In one embodiment, the present disclosure provides a system for wireless time synchronization, comprising a first electrical unit and a second electrical unit, which can in particular be intermittently wirelessly connected to each other, in particular via a low-energy connection, wherein the first electrical unit comprises a first time counter and the second electrical unit comprises a second time counter, and wherein a connection event occurs repeatedly at predetermined connection time intervals, in particular wherein the two electrical units are configured to perform a method according to description below, and wherein the first electrical unit is configured to
 transmit a first data packet to the second electrical unit upon a first connection event,
 receive a second data packet,
 determine a current time based on one or more time periods of the predetermined connection time interval and a second timestamp, and
 set the first time counter to the current time determined,
and wherein the second electrical unit is configured to
 receive the first data packet and create a second time stamp based on the second time counter,
 transmit a second data packet with the created second timestamp to the second electrical unit upon a next connection event.

In one embodiment, the present disclosure provides a vehicle, in particular a single-lane vehicle with driving assistance drive, such as an e-bike or the like, having a central communication interface, gear mechatronics, and/or a drive unit, comprising a system according to according to the description below, wherein, as electrical units, the central communication interface, the gear mechatronics or the drive unit is configured as one of the two electrical units.

One of the advantages achieved by this is that sufficiently accurate wireless time synchronization takes place in a straightforward manner. Furthermore, an energy-efficient method is provided, as the electrical units only communicate with each other at certain connection time intervals and are otherwise in a standby mode.

A connection event may comprise a connection setup and transmission of data. The connection time intervals at which the electrical units are connected to each other may be set beforehand by one of the electrical units involved or by a central unit or interface.

As part of a gear change, a central communication interface, gear mechatronics, and a drive unit may communicate. In particular, it is assumed that the electrical units are time synchronized with each other. It is possible that the gear mechatronics and the drive unit represent the first electrical unit in two separate synchronization methods, and the central communication interface represents the second electrical unit in each case. The gear mechatronics and the drive unit then adopt the local time of the central communication interface. However, in principle, other components of e-bikes can be conceived as electrical units.

Further features, advantages, and embodiments of the method according to the disclosure are described hereinafter or will be disclosed thereby.

According to an advantageous further development of the disclosure, the setting of the first time counter is carried out when a condition is met, wherein the condition is met if a time period between the transmission of the first data packet, by the first electrical unit, and the reception of the second data packet, by the first electrical unit, is less than the sum of two predetermined connection time intervals, and wherein otherwise the method steps a) to e) are performed again at least once, in particular until the condition is met. The advantage of this is that time synchronization is carried out reliably.

According to an advantageous further development of the disclosure, prior to transmitting the first data packet, a first timestamp is created based on the first time counter, by the first electrical unit, and wherein the first and second data packets comprise the first timestamp, and wherein the setting of the first time counter is carried out when a condition is met, wherein the condition is met if a time period between the time of the first timestamp and the reception of the second data packet, by the first electrical unit, is less than the sum of two predetermined connection time intervals, and wherein otherwise the method steps a) to e) are performed again at least once, in particular until the condition is met. In this way, accurate and verifiable time synchronization between the two electrical units is possible.

Checking one of the two aforementioned conditions also has the advantage that connection faults, for example as a result of interference signals, can be detected and considered during the synchronization process. If the connection fails, it is possible that a data packet is transmitted and also received not in the next connection event but in a delayed manner in a subsequent connection event. Checking the condition may detect whether a connection fault has occurred. If the time period comprises two or more connection time intervals, a fault has occurred. The synchronization method may then be repeated until the condition is met. This allows successful synchronization to be achieved.

According to an advantageous further development of the disclosure, the method steps a) to f) are performed again at predetermined time intervals, preferably 10 min. Different clock behaviors of the time counters, for example as a result of temperature influences or different inherent clock frequencies, may cause the local times of the time counters of the electrical units to increasingly deviate from each other, i.e., drift. By synchronizing at certain time intervals, the maximum deviation between the local times of the time counters can be limited.

According to an advantageous further development of the disclosure, a synchronicity of the first and second time counter is checked using the steps of:

creating a third timestamp, by one of the two electrical units, transmitting the created third timestamp, by the one electrical unit, to the other electrical unit upon a next connection event, receiving the third timestamp by the other electrical unit, determining an amount of a difference, by the other electrical unit, between the time of the transmitted third timestamp and a current local time of the one electrical unit at the time of receiving the third timestamp, performing the method steps a) to f) at least once if the amount of a difference is greater than or equal to the magnitude of a predetermined connection time distance, in particular as long as the amount of a difference is greater than a predetermined connection time interval.

This makes it particularly easy to check the synchronicity of the time counters of the electrical units. The difference determined may take both a positive and a negative value.

As the third timestamp may be created at any given time between two connection events, the amount of difference determined for synchronous time counters corresponds to at most one connection time interval. If the amount of the difference determined is greater than a connection time interval, the time counters are not synchronous. Alternatively, the creation of the third timestamp may occur at a set time. The sensitivity of the method is higher the closer this time is set to the next connection event.

According to a further advantageous development of the disclosure, the synchronicity is checked as a result of a particular event and/or at predetermined time intervals. An event may be an internal or external event. With regard to the e-bike area of application in particular, an internal event may be, for example, a connection request of the central communication interface to the drive unit. For example, actuating the gear shift lever is an external event that initiates a gear change. Thus, a check of the synchronicity of the electrical units can be initiated by a certain event before a certain operation for which a time synchronous behavior is assumed. In a further advantageous manner, the checking of the synchronicity can be carried out at certain time intervals. This can prevent excessive deviations in local times and can also provide an energy-efficient method, wherein the synchronization is only performed when required.

According to a further advantageous development of the disclosure, after setting the first time counter, a plausibility check is carried out by means of the steps of:

performing the method steps a) to e)

determining an amount of a difference, by the first electrical unit, between the current time determined in step e) and a local time of the first time counter, wherein it is considered plausible if the amount of a difference is less than 10 ms, preferably less than 5 ms, particularly preferably less than 1 ms, and greater than 1 ns, preferably greater than 1 µs.

Based on this procedure, it can be checked whether the synchronization method itself is suitable for determining reproducible values of the current time.

According to a further advantageous development of the disclosure, the connection time interval is set between 1 ns and 500 ms, preferably between 60 ms and 325 ms, particularly preferably between 100 ms and 150 ms. If the connection time interval is set between 100 ms and 150 ms, an energy-efficient and at the same time sufficiently accurate method for time synchronization may be provided.

According to a further advantageous development of the disclosure, the first and second electrical units each have a transmission queue, and a symmetry of a temporal transmission behavior of the first and second electrical units is checked based on an amount of a difference between a first transmission time interval of the first electrical unit and a second transmission time interval of the second electrical unit. The first transmission time interval comprises a processing time, and in particular a transmission time for the first data packet, and the second transmission time interval comprises a processing time and in particular a transmission time for the second data packet. The temporal transmission behavior is considered symmetrical if the amount of a difference is less than 10 ms, preferably less than 1 ms, particularly preferably less than 0.1 ms, and greater than 1 ns, preferably greater than 1 µs.

The accuracy of the synchronization method can be assessed using the amount of the difference determined. The processing time may include the amount of time from when a data packet is placed in the transmission queue until the data packet starts to be transmitted. The transmission time interval may be defined as the time from the start of transmitting until the receiving electrical unit fully receives the data packet.

According to a further advantageous development of the disclosure, a transmission protocol based on Bluetooth, Bluetooth Low Energy, WLAN, WiFi, Zigbee, NFC, Sigfox, Li-Fi, or Mioty is used to communicate between the first and second electrical units. Transmission protocols classified as WPAN—Wireless Personal Area Network—can be advantageous in this respect, as they are usually associated with low power consumption of the electrical units.

According to a further advantageous development of the disclosure, the data is transmitted in encrypted form. This prevents data from being accessed by third parties without authorization.

As part of a gear change, a central communication interface, gear mechatronics, and a drive unit may communicate. It is assumed that the electrical units are time-synchronized with each other. It is possible that the gear mechatronics and the drive unit represent the first electrical unit in two separate synchronization methods, and the central communication interface represents the second electrical unit in each case. The gear mechatronics and the drive unit then adopt the local time of the central communication interface. However, in principle, other components of e-bikes can be conceived as electrical units.

Further important features and advantages of the disclosure arise from the drawings, and the accompanying description of the drawings.

It is understood that the features specified hereinabove and the features yet to be explained hereinafter can be used not only in the respectively specified combination, but also in other combinations, or alone, without departing from the scope of the present disclosure.

Preferred designs and embodiments of the present disclosure are illustrated in the drawings and explained in greater detail in the subsequent description.

BRIEF DESCRIPTION OF THE DRAWINGS

Shown in schematic form are.

DETAILED DESCRIPTION

Figure 1:
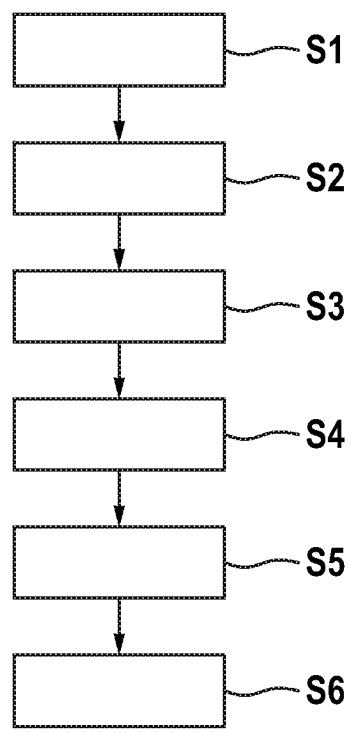
FIG. 1 shows steps of a method according to one embodiment of the present disclosure.

FIG. 1 shows in schematic form the steps of a method according to one embodiment of the present disclosure.

In a step S1, a first data packet is transmitted by the first electrical unit to the second electrical unit upon a first connection event.

In a step S2, the second electrical unit receives the first data packet and creates a second timestamp at the time of complete reception of the data packet based on the second time counter. To this end, for example, a so-called receive event can be triggered on an application layer and the reception time can be recorded.

Subsequently, in a step S3, the second electrical unit transmits a second data packet to the first electrical unit in the connection event following the connection event from step S1. The second data packet comprises the timestamp previously created in step S2.

In a step S4, the first electrical unit receives the second data packet and determines a current time immediately following receipt in a next step S5. This current time may be calculated by adding the time of the second timestamp from the second data packet to the time period of the predetermined connection time interval. The time thus determined corresponds to the current time of the second electrical unit.

In a step S6, the first time counter is then set to the current time determined in step S5. This concludes the synchronization process.

Figure 2:
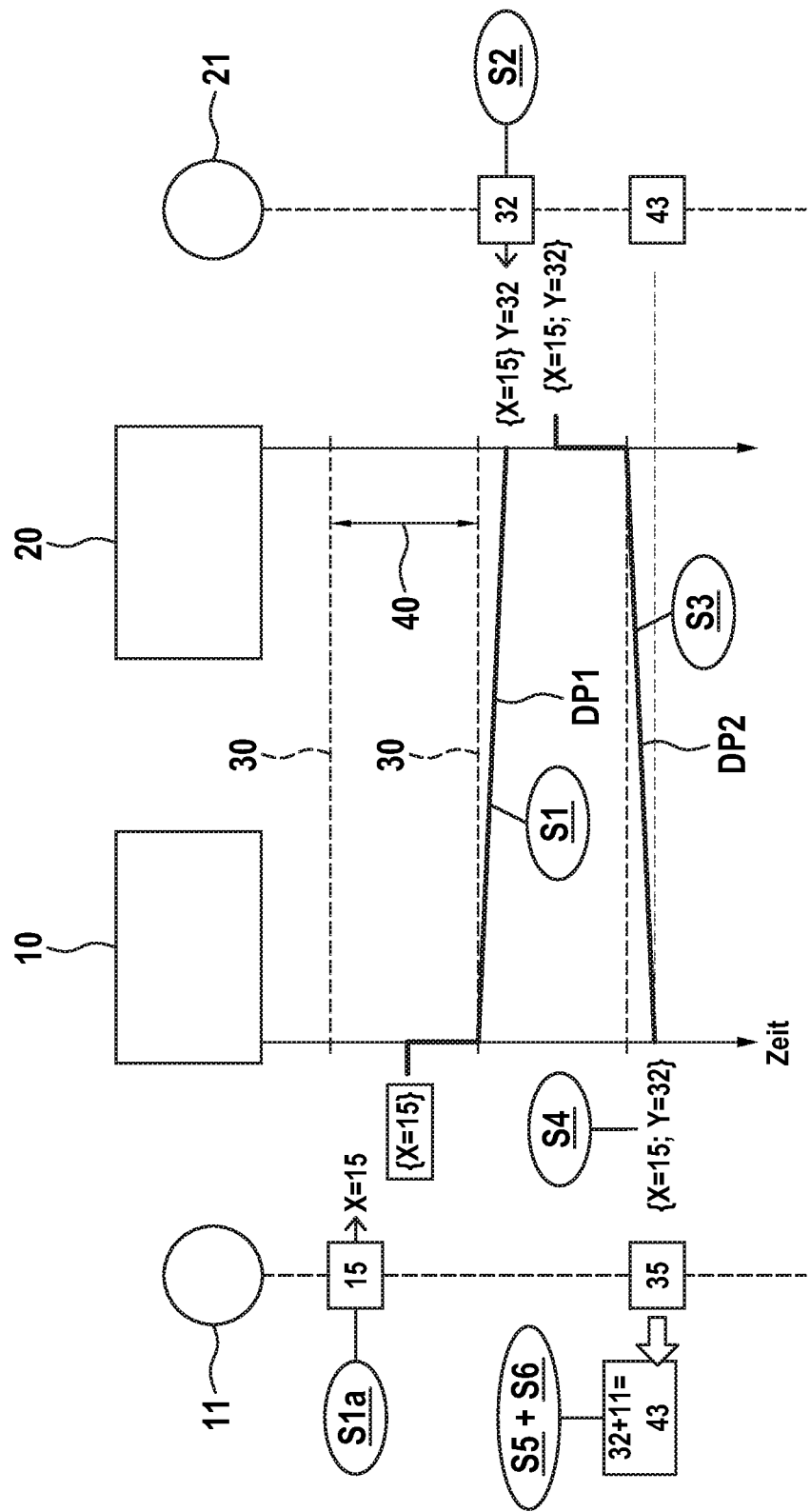
FIG. 2 shows in schematic form a time sequence of a synchronization method vehicle according to one embodiment of the present disclosure.

FIG. 2 shows in schematic form a time sequence of a synchronization method vehicle according to one embodiment of the present disclosure.

The two electrical units 10, 20 shown each have a transmission queue. The predetermined connection time interval 40 is 11 ms. In addition, it is assumed that the transmission times of the two electrical units 10, 20 are approximately the same. The unit [ms] is associated with the numbers shown in FIG. 2.

In a step S1a, the local time counter 11 of the first electrical unit 10 first creates a first timestamp, here X=15 with a local time, and then places it in the transmission queue. The creation of the timestamp may occur at any given time between two connection events 30.

In a first connection event 30 after placing the first timestamp in the transmission queue, a first data packet DP1 {X=15} with the first timestamp, here X=15, is transmitted to the second electrical unit in a step S1.

In a next step S2, the second electrical unit 20 receives the first data packet DP1 and creates a second timestamp Y=32 with the local time of the second electrical unit 20. The second timestamp, along with the first timestamp in a second data packet DP2, {X=15; Y=32}, is placed in the transmission queue of the second electrical unit 20 and transmitted to the first electrical unit 10 upon the next connection event 30 in a step S3.

In a step S4, the first electrical unit 10 receives the second data packet DP2 having the first and second timestamps and determines a current time in a step S5. The current time is calculated from the addition of the time of the second timestamp X=32 with the predetermined connection time interval of 11 ms to 43 ms.

In a step S6, the first electrical unit 10 sets its first time counter 11 to 43 ms. Thus, the two electrical units 10, 20 are time-synchronized.

Figure 3:
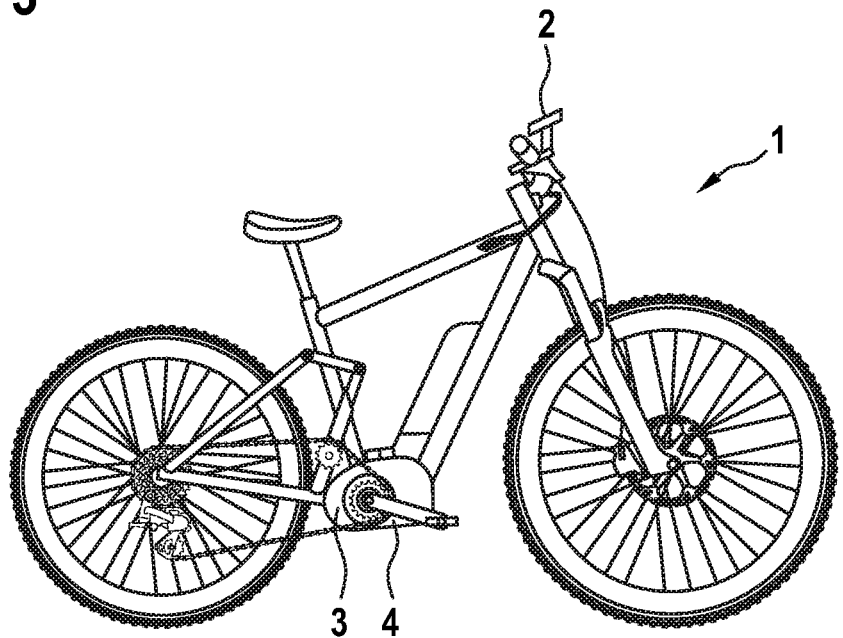
FIG. 3 shows a vehicle in schematic form according to one embodiment of the present disclosure.

FIG. 3 shows in schematic form a vehicle according to one embodiment of the present disclosure.

The vehicle 1 here is a bicycle having a drive assistance drive, in particular an e-bike, and comprises a central communication interface 2, which is fixed to the handlebars, for example, using a bracket. In addition, the bicycle 1 here has gear mechatronics 3 and a drive unit 4 in the area of the crank. The gear mechatronics 3, for example in the form of a derailleur or hub gear or a CVT, can preferably also be arranged on the rear wheel. The central communication interface 2, the gear mechatronics 3, and the drive unit 4 are configured to perform steps S1 to S6 according to FIG. 1.

Although the present disclosure has been described with reference to preferred embodiments, it is not limited thereto and can instead be modified in a variety of ways.

What is claimed is:

1. A method for wireless time synchronization of a first electrical unit with a second electrical unit which is intermittently wirelessly connected to each other via a low-energy connection, wherein the first electrical unit includes a first time counter and the second electrical unit includes a second time counter, and wherein a connection event occurs repeatedly at predetermined connection time intervals, comprising:
   a) transmitting a first data packet by the first electrical unit to the second electrical unit upon a first connection event;
   b) receiving the first data packet and creating a second timestamp based on the second time counter by the second electrical unit;
   c) transmitting a second data packet with the created second timestamp by the second electrical unit to the first electrical unit upon a next connection event;
   d) transmitting the second data packet by the first electrical unit;
   e) determining a current time by the first electrical unit based on one or more time periods of the predetermined connection time interval and the second timestamp; and
   f) setting the first time counter to the current time determined.

2. The method according to claim 1, wherein:
   the setting of the first time counter is carried out when a condition is met,
   the condition is met if a time period between the transmission of the first data packet by the first electrical unit and the reception of the second data packet by the first electrical unit is less than the sum of two predetermined connection time intervals, and otherwise the method steps (a) to (e) are performed again at least once.

3. The method according to claim 1, wherein:
   prior to transmitting the first data packet, a first timestamp is created based on the first time counter by the first electrical unit,
   the first and second data packets comprise the first timestamp,
   the setting of the first time counter is carried out when a condition is met,
   the condition is met if a time period between the time of the first timestamp and the reception of the second data packet by the first electrical unit is less than the sum of two predetermined connection time intervals, and otherwise the method steps (a) to (e) are performed again at least once.

4. The method according to claim 1, wherein the method steps (a) to (f) are performed again at predetermined time intervals.

5. The method according to claim 1, wherein a synchronicity of the first and second time counters is checked using the steps:
   creating a third timestamp by one of the two electrical units,
   transmitting the created third timestamp by the one electrical unit to the other electrical unit upon a next connection event,
   receiving the third timestamp by the other electrical unit,
   determining an amount of a difference by the other electrical unit between the time of the transmitted third timestamp and a current local time of the one electrical unit at the time of receiving the third timestamp, and
   performing the method steps (a) to (f) at least once if the amount of a difference is greater than or equal to the magnitude of a predetermined connection time interval.

6. The method according to claim 5, wherein checking a synchronicity is performed as a result of a particular event and/or at predetermined time intervals.

7. The method according to claim 1, wherein after setting the first time counter, a plausibility check is performed using the steps:
   performing the method steps (a) to (e), and
   determining an amount of a difference by the first electrical unit between the current time determined in step (e) and a local time of the first time counter, wherein it is considered plausible if the amount of a difference is less than 10 ms, and greater than 1 ns.

8. The method according to claim 1, wherein the connection time interval is set between 1 ns and 500 ms.

9. The method according to claim 1, wherein:
   the first and second electrical units each comprises a transmission queue,
   a symmetry of a temporal transmission behavior of the first and second electrical units is checked based on an amount of a difference between a first transmission time period of the first electrical unit and a second transmission time period of the second electrical unit,
   the first transmission time period comprises a transmission time for the first data packet, and the second transmission time duration comprises a transmission time for the second data packet, and
   said transmission time is considered symmetrical if the amount of a difference is less than 0.1 ms, and greater than 1 ns.

10. The method according to claim 1, wherein a transmission protocol based on Bluetooth, Bluetooth Low Energy, WLAN, WiFi, Zigbee, NFC, Sigfox, Li-Fi, or Mioty is used to communicate between the first and second electrical units.

11. The method according to claim 1, wherein data is transmitted in encrypted form.

12. The method according to claim 1, wherein:
   the setting of the first time counter is carried out when a condition is met,
   the condition is met if a time period between the transmission of the first data packet by the first electrical unit and the reception of the second data packet by the first electrical unit is less than the sum of two predetermined connection time intervals, and otherwise the method steps (a) to (e) are performed until the condition is met.

13. The method according to claim 1, wherein:
   prior to transmitting the first data packet, a first timestamp is created based on the first time counter by the first electrical unit,
   the first and second data packets comprise the first timestamp,
   the setting of the first time counter is carried out when a condition is met,
   the condition is met if a time period between the time of the first timestamp and the reception of the second data packet by the first electrical unit is less than the sum of two predetermined connection time intervals, and otherwise the method steps (a) to (e) are performed until the condition is met.

14. The method according to claim 1, wherein the method steps (a) to (f) are performed again at predetermined time intervals of 10 min.

15. The method according to claim 1, wherein a synchronicity of the first and second time counters is checked using the steps:
creating a third timestamp by one of the two electrical units,
transmitting the created third timestamp by the one electrical unit to the other electrical unit upon a next connection event,
receiving the third timestamp by the other electrical unit,
determining an amount of a difference by the other electrical unit between the time of the transmitted third timestamp and a current local time of the one electrical unit at the time of receiving the third timestamp, and
performing the method steps (a) to (f) at least once if the amount of a difference is greater than or equal to the magnitude of a predetermined connection time interval as long as the amount of a difference is greater than a predetermined connection time interval.

16. The method according to claim 1, wherein after setting the first time counter, a plausibility check is performed using the steps:
performing the method steps (a) to (e), and
determining an amount of a difference by the first electrical unit between the current time determined in step (e) and a local time of the first time counter, wherein it is considered plausible if the amount of a difference is less than 1 ms, and greater than 1 μs.

17. The method according to claim 1, wherein the connection time interval is set between 100 ms and 150 ms.

18. The method according to claim 1, wherein:
the first and second electrical units each comprises a transmission queue,
a symmetry of a temporal transmission behavior of the first and second electrical units is checked based on an amount of a difference between a first transmission time period of the first electrical unit and a second transmission time period of the second electrical unit,
the first transmission time period comprises a transmission time for the first data packet, and the second transmission time duration comprises a transmission time for the second data packet, and
said transmission time is considered symmetrical if the amount of a difference is less than 10 ms, and greater than 1 μs.

19. A system for wireless time synchronization, comprising a first electrical unit and a second electrical unit which can be intermittently wirelessly connected to each other via a low-energy connection, wherein:
the first electrical unit comprises a first time counter and the second electrical unit comprises a second time counter,
a connection event occurs repeatedly at predetermined connection time intervals,
the two electrical units are configured to perform a method according to claim 1,
the first electrical unit is configured to:
transmit a first data packet to the second electrical unit upon a first connection event,
receive a second data packet,
determine a current time based on one or more time periods of the predetermined connection time interval and the second timestamp, and
set the first time counter to the current time determined, and
the second electrical unit is configured to:
receive the first data packet and create a second timestamp based on the second time counter, and
transmit a second data packet with the created second timestamp to the second electrical unit upon a next connection event.

20. A single-lane vehicle with driving assistance drive, comprising:
a central communication interface; and
gear mechatronics and/or a drive unit, comprising a system according to claim 19,
wherein the central communication interface, the gear mechatronics, or the drive unit is configured as one of the two electrical units.

* * * * *